(12) United States Patent
Kim

(10) Patent No.: US 6,842,683 B2
(45) Date of Patent: Jan. 11, 2005

(54) METHOD OF CONTROLLING TRAVELING STABILITY OF VEHICLE

(75) Inventor: Dong-Shin Kim, Seoul (KR)

(73) Assignee: Mando Corporation, Pyungtak (KR)

( * ) Notice: Subject to any disclaimer, the term of this patent is extended or adjusted under 35 U.S.C. 154(b) by 57 days.

(21) Appl. No.: 10/269,537

(22) Filed: Oct. 11, 2002

(65) Prior Publication Data

US 2003/0163237 A1 Aug. 28, 2003

(30) Foreign Application Priority Data

Feb. 23, 2002 (KR) .......................................... 2002-9735

(51) Int. Cl.⁷ .............................. G06F 7/70; B60T 8/00; B60K 28/16
(52) U.S. Cl. ............................ 701/70; 701/80; 180/197
(58) Field of Search ................................ 701/70, 80, 36, 701/73, 74, 78, 72, 83; 73/9; 702/85; 303/146, 148, 140, 150; 180/197

(56) References Cited

U.S. PATENT DOCUMENTS

| | | | |
|---|---|---|---|
| 5,471,388 A | 11/1995 | Zomotor et al. ............... 701/36 |
| 5,668,724 A | 9/1997 | Ehret et al. ..................... 701/80 |
| 5,710,705 A | 1/1998 | Eckert ................. 364/426.028 |
| 5,862,503 A * | 1/1999 | Eckert et al. .................. 701/78 |
| 6,308,115 B1 * | 10/2001 | Yamaguchi et al. ............. 701/1 |
| 6,409,287 B1 * | 6/2002 | Leach et al. ................. 303/146 |
| 6,526,804 B2 * | 3/2003 | Takahashi ......................... 73/9 |

FOREIGN PATENT DOCUMENTS

| | | |
|---|---|---|
| DE | 100 26 102 A | 2/2001 |
| EP | 0 914 997 A2 | 5/1999 |

* cited by examiner

Primary Examiner—Tan Q. Nguyen
Assistant Examiner—Dalena Tran
(74) Attorney, Agent, or Firm—Ladas & Parry

(57) ABSTRACT

Disclosed herein is a method of controlling traveling stability of a vehicle. In the present invention, a driver's desired yaw rate is estimated using a steering wheel angle and a reference speed of the vehicle while turning. The condition of a road surface the vehicle is traveling on is judged by comparing lateral acceleration of the vehicle, estimated using the estimated yaw rate and a reference vehicle speed, with lateral acceleration actually measured by a lateral acceleration sensor. A driver's desired reference yaw rate is determined according to the judged road surface condition. It is determined whether a vehicle is understeered or oversteered by comparing the determined reference yaw rate with an actual yaw rate measured by a yaw rate sensor. According to the determined result, braking force and driving force of the vehicle are controlled, thus obtaining excellent vehicle stability.

3 Claims, 6 Drawing Sheets

FIG.4

| VEHICLE SPEED \ STEERING WHEEL ANGLE | δ1 | ... | δm |
|---|---|---|---|
| V1 | G11 | ... | Gm1 |
| ⋮ | ⋮ | ⋮ | ⋮ |
| Vn | G11 | ... | Gmn |

FIG.5

| ROAD SURFACE FRICTION COEFFICIENT / STEERING WHEEL ANGLE | $\mu 1$ | ... | $\mu n$ |
|---|---|---|---|
| $\delta 1$ | $\lambda 11$ | ... | $\lambda m1$ |
| ⋮ | ⋮ | ⋮ | ⋮ |
| $\delta m$ | $\lambda 1n$ | ... | $\lambda mn$ |

METHOD OF CONTROLLING TRAVELING STABILITY OF VEHICLE

BACKGROUND OF THE INVENTION

1. Field of the Invention

The present invention relates generally to a method of controlling the traveling stability of a vehicle, and more particularly to a method of controlling the traveling stability of a vehicle, which can obtain the traveling stability of a vehicle by controlling braking force and driving force in understeering or oversteering of the vehicle.

2. Description of the Prior Art

Generally, an antilock brake system (ABS) is used to prevent locking of wheels by suitably controlling braking pressure applied to the wheels according to a slip rate calculated on the basis of wheel speed. A traction control system (TCS) is used to control the driving force of an engine so as to prevent excessive slip when vehicles suddenly start or accelerate.

The ABS and TCS can show excellent performance when a vehicle travels on a straight road. However, when the vehicle travels while turning along a curved road, understeering (plowing) may occur in which the vehicle excessively slants outwardly, as well as oversteering (spinning-out) in which the vehicle excessively slants inwardly.

Therefore, a vehicle stability system is required to stably control the position of the vehicle under any conditions that the vehicle travels in, that is, preventing the loss of steering of the vehicle. For example, when understeering occurs, in which the vehicle is pushed outwardly from a driver's desired traveling track while turning, braking force is applied to an inner rear wheel, thus preventing the vehicle from being pushed outwardly. When oversteering occurs, in which the yaw rate of the vehicle excessively increases while turning and the vehicle then slants inwardly from a driver's desired traveling track, an operation of applying braking force to an outer front wheel is required.

In order to control the vehicle stability while turning, the performance of the vehicle stability system is determined according to whether the system can exactly predict a driver's desired yaw rate for the vehicle, and apply suitable braking pressure to front wheels and rear wheels to enable the vehicle to travel on according to the predicted yaw rate.

Further, the control of vehicle stability must not deteriorate the performance of both the antilock brake system and the traction control system. Similarly, the antilock brake system and the traction control system must not have undesirable effects on vehicle stability.

Accordingly, in order to control vehicle stability suitably for the traveling state of the vehicle, it is preferable to cooperatively control vehicle stability in connection with the conventional antilock brake system and the traction control system while exactly predicting a driver's desired yaw rate for the vehicle.

SUMMARY OF THE INVENTION

Accordingly, the present invention has been made keeping in mind the above problems occurring in the prior art, and an object of the present invention is to provide a method of controlling the traveling stability of a vehicle, which can obtain vehicle stability by exactly predicting a driver's desired yaw rate and controlling the braking and driving force of a vehicle together in order to allow an actual track of the vehicle to follow a track based on the predicted yaw rate.

In order to accomplish the above object, the present invention provides a method of controlling traveling stability of a vehicle, comprising the steps of setting driver's desired yaw rates on various road surface conditions using a steering wheel angle and a reference speed of the vehicle while turning; judging a road surface condition on which the vehicle is traveling, by comparing lateral acceleration of the vehicle, which is estimated using the reference vehicle speed and a preset yaw rate on a preset reference road surface condition, with actual lateral acceleration measured by a lateral acceleration sensor; determining one of the driver's desired yaw rates corresponding to the judged road surface condition as a reference yaw rate, and determining whether the vehicle is understeered or oversteered by comparing the determined reference yaw rate with an actual yaw rate measured by a yaw rate sensor, and controlling braking force and driving force according to the determination result.

BRIEF DESCRIPTION OF THE DRAWINGS

The above and other objects, features and other advantages of the present invention will be more clearly understood from the following detailed description taken in conjunction with the accompanying drawings, in which:

FIG. 4 is a view showing a gain used to calculate a driver's desired yaw rate on a high-friction road surface;

FIG. 5 is a view showing a lookup table of a target slip of wheels based on a vehicle speed and a road surface friction coefficient.

DESCRIPTION OF THE PREFERRED EMBODIMENTS

Hereinafter, embodiments of the present invention will be described in detail with reference to the attached drawings.

The present invention is characterized in that it prevents the loss of steering control of a vehicle by applying braking force to an inner rear wheel when understeering (plowing) occurs in which a vehicle is pushed outwardly from a desired traveling course while turning, and by applying braking force to an outer front wheel when oversteering (spinning-out) occurs in which the turning radius of the vehicle is rapidly decreased and the vehicle stability is lost due to the undesirable increase in the yaw rate of the vehicle.

Figure 1:
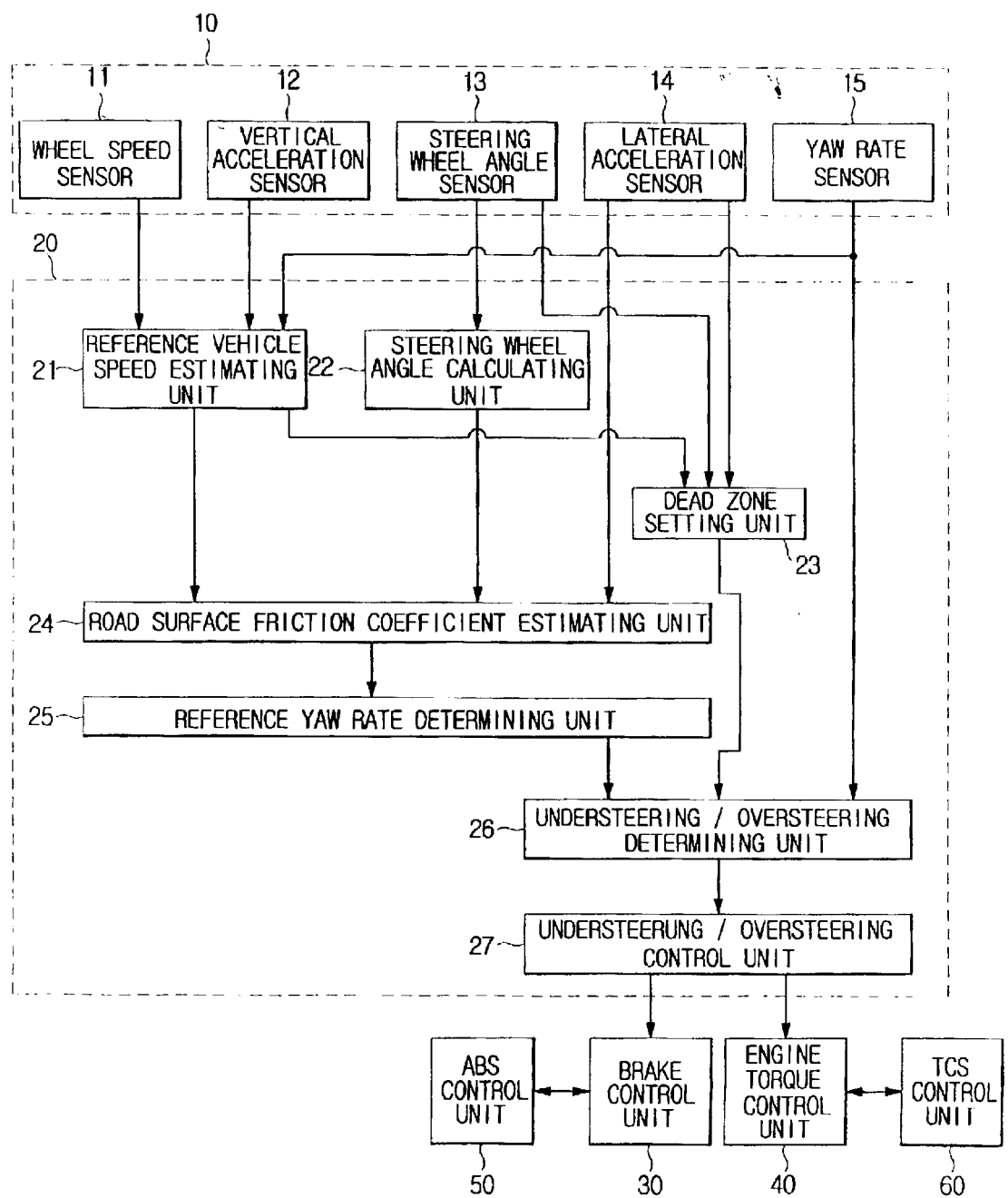
FIG. 1 is a block diagram of a system for controlling the traveling stability of a vehicle according to the present invention.

FIG. 1 is a block diagram of a system for controlling the traveling stability of a vehicle according to the present invention. As shown in FIG. 1, the traveling stability control system of the present invention comprises a measuring unit 10, an electronic control unit 20, a brake control unit 30, an engine torque control unit 40, an ABS control unit 50 and a TCS control unit 60.

The measuring unit 10 comprises a wheel speed sensor 11 for detecting wheel speeds of four wheels, a vertical acceleration sensor 12 for detecting vertical acceleration of the vehicle, a steering wheel angle sensor 13 for detecting the steering wheel angle of a steering wheel, a lateral acceleration sensor 14 for detecting lateral acceleration of the vehicle, and a yaw rate sensor 15 for detecting the yaw rate of the vehicle. In this case, the vertical acceleration sensor 12 is applied only to four-wheel drive cars.

The electronic control unit 20 comprises a reference vehicle speed estimating unit 21, a steering wheel angle calculating unit 22, a dead zone setting unit 23, a road surface friction coefficient estimating unit 24, a reference yaw rate estimating unit 25, a understeering/oversteering determining unit 26 and a understeering/oversteering control unit 27. The reference vehicle speed estimating unit 21 estimates a reference speed of the vehicle using values detected by the wheel speed sensor 11 and the vertical acceleration sensor 12. The steering wheel angle calculating unit 22 calculates a steering wheel angle of the steering wheel using a value detected by the steering wheel angle sensor 13. The dead zone setting unit 23 sets a dead zone for determining a vehicle stability control time and understeering/oversteering of the vehicle using the lateral acceleration detected by the lateral acceleration sensor 14, the reference vehicle speed and the steering wheel angle. The road surface friction coefficient estimating unit 24 estimates a driver's desired yaw rate on a reference road surface (high-friction road surface) using the reference vehicle speed and the steering wheel angle, compares lateral acceleration estimated using the yaw rate and the reference vehicle speed with the lateral acceleration detected by the lateral acceleration sensor 14, and estimates a road surface friction coefficient of the vehicle according to the compared result. The reference yaw rate estimating unit 25 determines a driver's desired reference yaw rate on a road surface of the estimated road surface friction coefficient. The understeering/oversteering determining unit 26 determines whether a vehicle is understeered or oversteered by comparing a difference between the reference yaw rate and the yaw rate detected by the yaw rate sensor 15 with the set dead zone. The understeering/oversteering control unit 27 controls the braking force of the vehicle and the driving force of an engine by independently controlling the brake control unit 30 and the engine torque control unit 40, or by cooperatively controlling them with the ABS control unit 50 and the TCS control unit 60, on the basis of the determined understeering or oversteering.

The brake control unit 30 brakes the vehicle by controlling the pressure of brake fluid supplied to a wheel cylinder of a corresponding wheel from an oil pressure modulator.

The engine torque control unit 40 controls the driving force of the engine by transmitting target torque to an engine controller.

Figure 2:
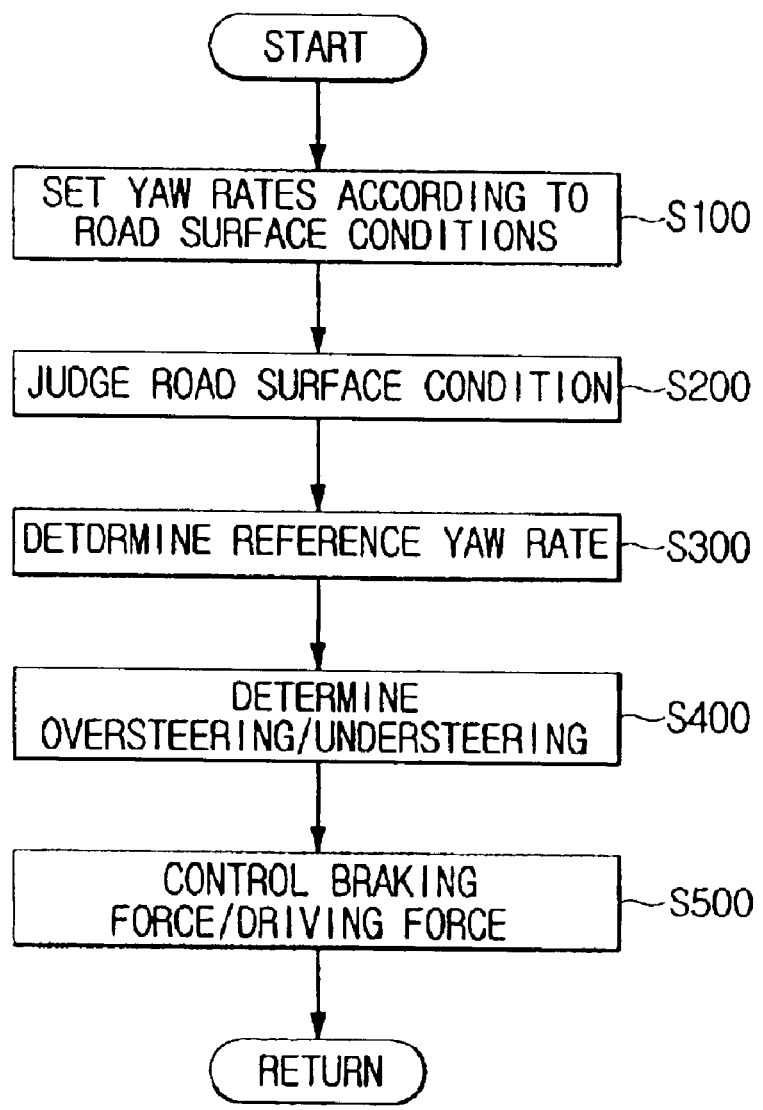
FIG. 2 is a flowchart of an entire process of the traveling stability control system according to the present invention.

FIG. 2 is a flowchart of an entire process of the system for controlling the traveling stability of a vehicle according to the present invention. As shown in FIG. 2, the electronic control unit 20 sets driver's desired yaw rates for the vehicle according to road surface conditions at step S100. In this case, the electronic control unit 20 calculates a driver's desired yaw rate on a high-friction road surface by applying the reference vehicle speed obtained by the reference vehicle speed estimating unit 21 and the steering wheel angle obtained by the steering wheel angle calculating unit 22 to a vehicle movement model on the high-friction road surface. Further, the electronic control unit 20 calculates a driver's desired yaw rate on a low-friction road surface by applying the reference vehicle speed obtained by the reference vehicle speed estimating unit 21 and the lateral acceleration detected by the lateral acceleration sensor 14 to a vehicle movement model on the low-friction road surface.

If the driver's desired vehicle yaw rates according to road surface conditions are calculated, the electronic control unit 20 judges whether a road surface the vehicle is traveling on is a road surface with a high-friction coefficient or a road surface with a low-friction coefficient on the basis of values detected by various sensors of the measuring unit 10 at step S200.

If it is judged that the road surface being traveled is a road surface with a high friction coefficient, the electronic control unit 20 determines the driver's desired yaw rate on the high-friction road surface set at step S100 as a reference yaw rate, while if it is judged that the road surface being traveled is a road surface with a low-friction coefficient, the electronic control unit 20 determines the driver's desired yaw rate on the low-friction road surface as a reference yaw rate at step S300.

If the driver's desired reference yaw rate is determined, the electronic control unit 20 determines whether a vehicle is oversteered or understeered by comparing the actual yaw rate of the vehicle, detected by the yaw rate sensor 15, with the reference yaw rate through the understeering/oversteering determining unit 26 and with reference to the dead zone set by the dead zone setting unit 23 at step S400.

On the basis of the determined vehicle condition, if the vehicle is understeered, the electronic control unit 20 prevents the loss of vehicle steering control by applying the braking force to an inner rear wheel by controlling the brake control unit 30 and the engine torque control unit 40 through the understeering/oversteering control unit 27, or, if necessary, by controlling them while cooperating with the ABS control unit 50 and the TCS control unit 60 at step S500. On the other hand, if the vehicle is oversteered, the electronic control unit 20 prevents the loss of vehicle steering control by applying the braking force to an outer front wheel by controlling the brake control unit 30 and the engine torque control unit 40 through the understeering/oversteering control unit 27, or, if necessary, by controlling them while cooperating with the ABS control unit 50 and the TCS control unit 60.

In this case, if cooperative control with the ABS system is performed, the remaining pair of diagonal wheels, as well as the inner rear wheel and the outer front wheel, are controlled so as to increase lateral force.

That is, oversteering occurs when rear wheels reach a contact limit of tires and the road surface earlier than the front wheels, so yaw moment generated by the front wheels is decreased by controlling the braking devices of the front wheels. On the contrary, when the front wheels reach a contact limit of tires and the road surface earlier than the rear wheels and understeering occurs, the vehicle can move along a desired track by controlling the rear wheels. If the friction coefficient of the road surface is varied, greater oversteering may occur. Therefore, if a difference between the reference yaw rate and the actual measured yaw rate increases to become greater than a regulated variation, vehicle stability can be obtained by controlling an outer rear wheel together with the outer front wheel. Further, when the understeering occurs, the inner front wheel is also controlled simultaneously with the inner rear wheel in the same manner as that of controlling the oversteering.

Additionally, in the present invention, in the case where optimal stability and comfort cannot be obtained by the control of braking force, there is carried out a control operation of reducing engine driving force as well as the braking force to minimize the rocking phenomenon of a car caused by excessive braking force.

Hereinafter, a method of setting the driver's desired vehicle yaw rate according to road surface conditions, as shown in FIG. 2, is described in detail.

<Driver's Desired Yaw Rate for the Vehicle on the High-Friction Road Surface>

The yaw rate representing a driver's desired vehicle track on the high-friction road surface is determined from a steering wheel angle and a vehicle speed (reference vehicle speed) on the basis of basic physical rules.

Figure 3:
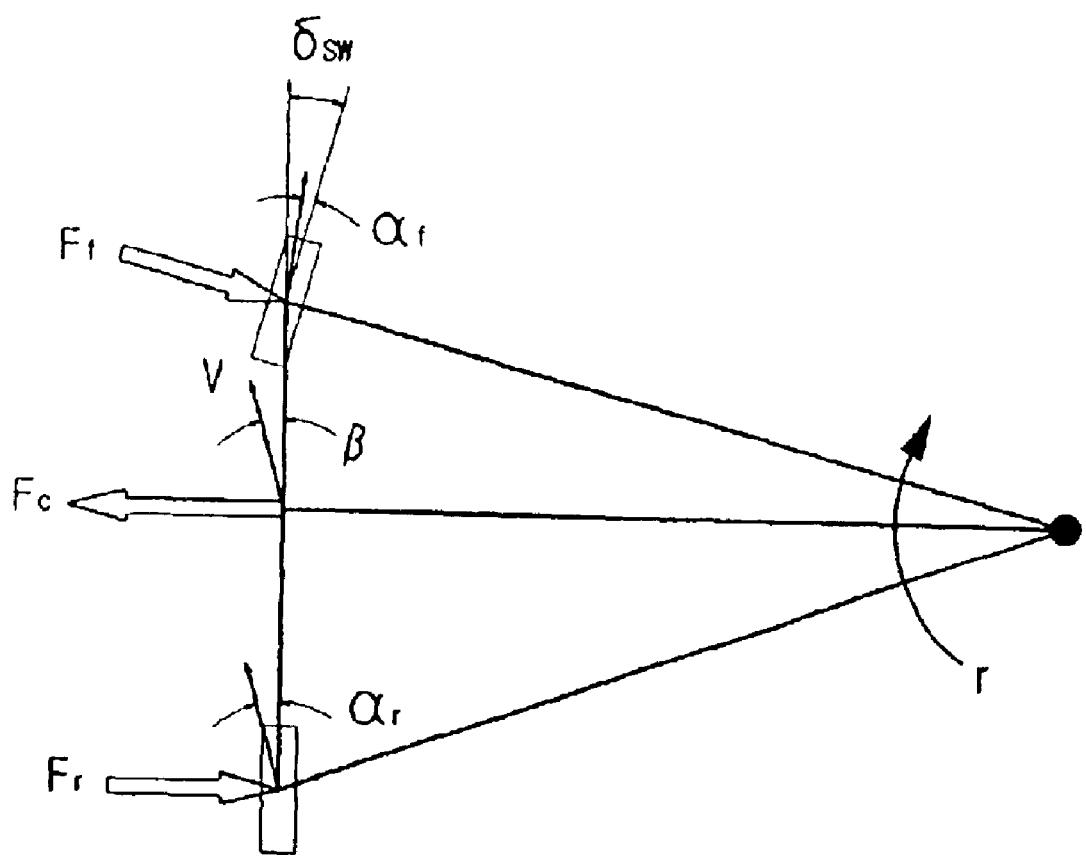
FIG. 3 is a view showing a vehicle modeled by a two-degree-of-freedom system.

FIG. 3 is a view showing a vehicle modeled by a two-degree-of-freedom system.

Equation [1] indicates an equation of movement of the vehicle for a vehicle yaw rate and a vehicle slip angle $\beta$, and can be derived from Newton's second law and a differential concept, $$I_z \dot{r} = N_\beta \beta + N_r r + N_\delta \delta_{sw} \qquad \text{Eq. [1]}$$
$$mV(\dot{r} + \beta) = Y_\beta \beta + Y_r r + Y_\delta \delta_{sw}$$

wherein $N_\delta$ is a control moment derivative $(-l_f c_f)$, $Y_\delta$ is a control force derivative $(c_f)$, $N_r$ is a yaw damping derivative $[(l_f^2 c_f + l_r^2 c_r)/V]$, $Y_\beta$ is a side slip damping derivative $(c_f + c_r)$, $N_\beta$ is a static directional stability derivative $(l_f c_f - l_r c_r)$, $Y_r$ is a lateral force/yaw coupling derivative $[(l_f c_f - l_r c_r)/V]$, $I_z$ is a vehicle's inertia of moment about z-axis, m is vehicle mass, l is a distance between the axle and the center of gravity, wherein the subscripts f and r respectively represent front and rear wheels, c is tire cornering stiffness, and V is a vehicle speed.

The following Equation [2] can be obtained by rearranging Equation [1] for the vehicle yaw rate. Further, the driver's desired yaw rate $r_{desired}$ can be obtained using the steering wheel angle $\delta_{sw}$ and the vehicle speed V by Equation [2].

$$\frac{r_{desired}}{\delta_{sw}} = G_{ij}\left(C_1 + \frac{C_2}{V} + C_3 V\right) \qquad \text{Eq. [2]}$$

In this case, coefficients $C_1$, $C_2$ and $C_3$ of Equation [2] are determined from respective derivatives of Equation [1]. However, a driver's desired yaw rate must not be satisfied with a typical single operating point, but be satisfied with all driving conditions. Therefore, the values of the coefficients $C_1$, $C_2$ and $C_3$ must be varied according to the variations in the steering wheel angle and the vehicle speed. That is, the interval of the steering wheel angle is divided into m steps, the interval of the vehicle speed is divided into n steps, and then the yaw rate gain $G_{ij}(i:1\sim m, j:1\sim n)$ for a vehicle model is obtained by a test. Thereafter, the obtained yaw rate gain $G_{ij}$ is multiplied by the coefficients $C_1$, $C_2$ and $C_3$, respectively. In this case, the gain is a compensation value for variations in the vehicle speed and the steering wheel angle, as shown in FIG. 4.

<Driver's Desired Yaw Rate for the Vehicle on the Low-Friction Road Surface>

The yaw rate $r_{desired}$ representing a driver's desired vehicle track on the low-friction road surface is determined from lateral acceleration of the vehicle and the vehicle speed (reference vehicle speed).

If the road surface friction coefficient is small, the vehicle can trace a driver's desired traveling track by using the yaw rate $r_{desired}$ obtained by the above Equation [2]; however, the vehicle slip angle increases, thus lowering stability. In this case, the vehicle can move in a desired direction while obtaining vehicle stability by restricting the yaw rate $r_{desired}$.

In the present invention, the restriction of the yaw rate $r_{desired}$ is determined by the following Equation [3] representing basic vehicle kinematics, $$a_{y,max} = f(\mu, V) \qquad \text{Eq. [3]}$$
$$r_{desired} = \frac{a_{y,max}}{V}$$

where $a_{y,max}$ is a maximum value of lateral acceleration restricted by the road surface friction coefficient, and determined by filtering the measured lateral acceleration.

Hereinafter, a method of judging a road surface condition of FIG. 2 is described in detail.

Figure 6:
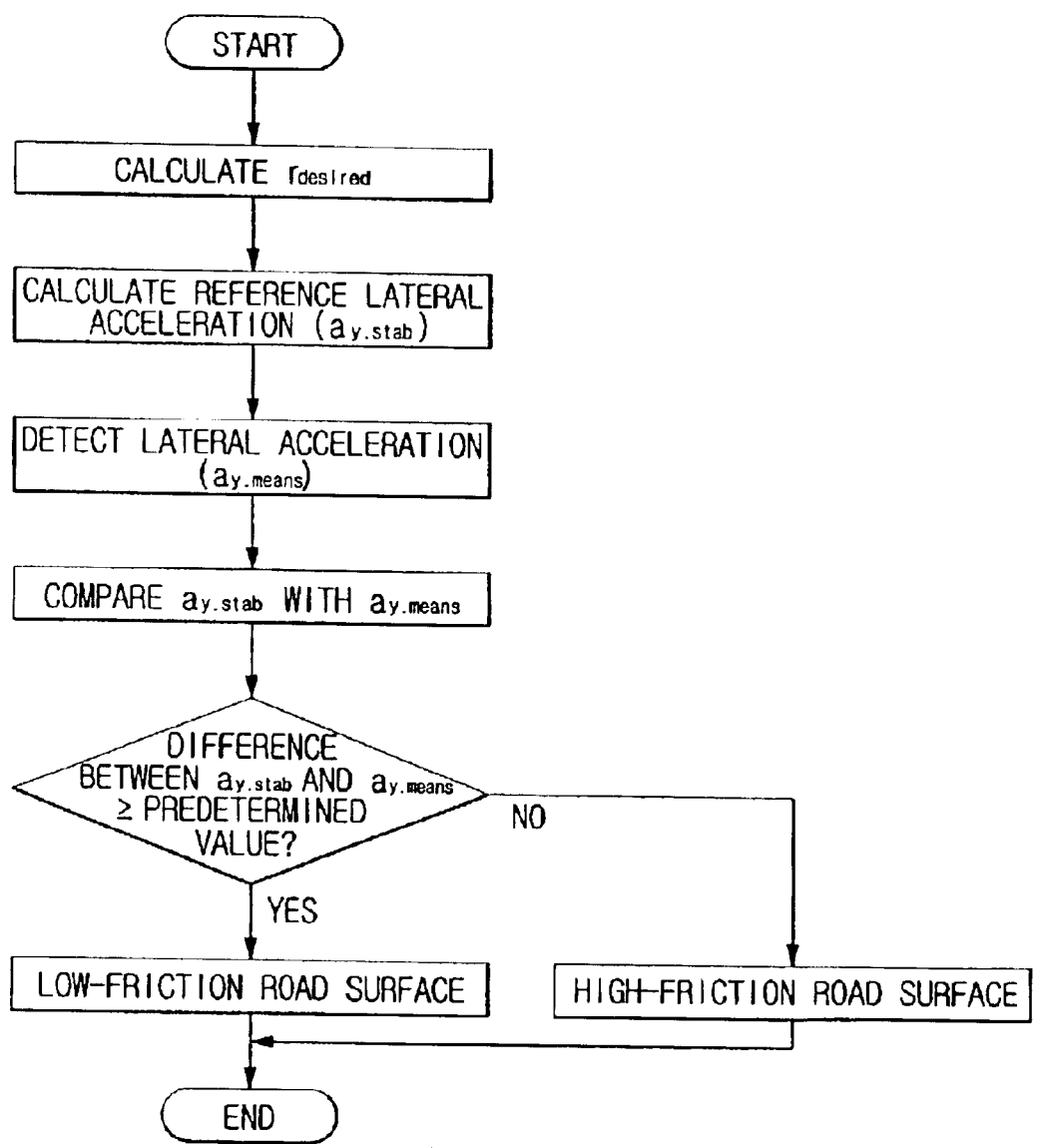
FIG. 6 is a flowchart of a method of judging the condition of a road surface being traveled, using lateral acceleration of the vehicle.

FIG. 6 is a flowchart of a method of judging the condition of a road surface being traveled, using lateral acceleration of the vehicle. As indicated in Equation [3], the vehicle's lateral acceleration $a_y$ can be represented by a function of the road surface friction coefficient $\mu$ and the vehicle speed V.

If a difference between a reference lateral acceleration $a_{y,stab}$ (multiplication of $r_{desired}$ by V) and the measured lateral acceleration $a_{y,means}$ is equal to or greater than a predetermined value $\Delta \mu_{ay}$, the road surface being traveled is judged to be a road surface with a low-friction coefficient, otherwise, the road surface being traveled is judged to be a road surface with a high-friction coefficient. On the low-friction road surface, the lateral acceleration restricted by the road surface friction coefficient of Equation [3], that is, $a_{y,max}$, are used. Further, in order to prevent the underestimation of road surface friction due to a slight steering wheel angle, the lateral acceleration is determined in consideration of a maximum value of lateral acceleration measured during the turning movement of the vehicle.

Hereinafter, a method of determining a driver's desired yaw rate for the vehicle according to road surfaces, determining whether the vehicle is oversteered or understeered, and controlling braking force and driving force according to the determined result is described.

As described above, if the road surface the vehicle is traveling on is a high-friction road surface, a driver's desired yaw rate for the vehicle is calculated by Equation [2], and is determined to be the reference yaw rate. On the other hand, if the road surface being traveled is a low-friction road surface, a driver's desired yaw rate is calculated by Equation [3] and is determined to be the reference yaw rate.

If the reference yaw rate is determined, an actual measured yaw rate of the vehicle is compared with the reference yaw rate, such that a difference therebetween is calculated. Thereafter, the difference is compared with the dead zone, so it can be determined whether the vehicle is oversteered or understeered.

A dead zone setting method is hereinafter described. A vehicle stability control system must operate under all driving conditions, and must not be prevented from driving due to unnecessary control. Therefore, a dead zone is set by the following Equation [4], $$DZone = K_0 + K_1 \delta + K_2 d\delta + K_3 a_y + K_4 Vref \qquad \text{Eq. [4]}$$

where $K_0$ to $K_4$ are variables, $\delta$ is a steering wheel angle, $d\delta$ is a derivative of the steering wheel angle, $a_y$ is a lateral acceleration value of the vehicle (measured value), and Vref is a reference vehicle speed.

The dead zone is not controlled when a difference between the driver's desired yaw rate $r_{desired}$ and the actual yaw rate is within a predetermined base value $K_0$. A control range of the dead zone is determined on the basis of the steering wheel angle, the variation in the steering wheel angle, and the vehicle's lateral acceleration. In this case, the values of $K_1$ to $K_4$ are respectively varied according to the steering wheel angle, the variation in the steering wheel angle, the vehicle's lateral acceleration value, and the reference vehicle speed. Further, coefficient values are determined for respective intervals using the concept of FIG. 4.

Further, the dead zone range increases when the vehicle travels on a banked road, thus preventing malfunction. Furthermore, the dead zone range increases in consideration of an error in the driver's desired yaw rate, generated by the variation of suspension, steering and tires, thus increasing the robustness of the vehicle stability system. On the other hand, the dead zone is not operated during the low-speed driving and during the backward driving which is different from the forward driving, from the viewpoint of vehicle dynamics.

If the dead zone is set, a difference Δyaw between the actual measured yaw rate for the vehicle and the reference yaw rate is compared with the dead zone value. If an absolute value of the difference is greater than the dead zone value, and the difference Δyaw is negative, it is determined that the vehicle is understeered, while if the absolute value of the difference is greater than an absolute value of the dead zone value and the difference Δyaw is positive, it is determined that the vehicle is oversteered.

Hereinafter, there is described, in detail, a method of controlling braking force and driving force when the vehicle is oversteered or understeered on the basis of the determined result of FIG. 2.

<Amount of Control for Wheel Pressure and Generation of Pressure>

The vehicle stability control system of the present invention controls an inner rear wheel and an outer front wheel when understeering (plowing) and oversteering (spinning-out) are sensed. Further, if the sensed amount of understeering or oversteering is greater than a reference value, different wheels on the same sides are controlled together. In this case, the controlled wheel pressure is determined by an optimal control theory (rough tuning), and an actual control value (fine tuning) is determined through a vehicle test according to a difference between the reference yaw rate and the actual measured yaw rate, and the variation of the two. In this case, the control pressure is restricted in consideration of the slip of wheels. An excessive increase in the pressure may cause the wheels to be locked, and may prevent compensation yaw moment from further increasing at a wheel slip equal to or greater than a predetermined wheel slip, thus consequently decreasing the vehicle stability, and causing frequent pressure control. Equation [5] represents an objective function (performance index) for controlling the wheel pressure so as to obtain optimal traveling stability and short and prompt pressure control, and facilitate the driver's will to travel by preventing and excessive decrease in engine torque. Further, the pressure control is performed to minimize the objective function.

$$J = \int [W_1(r_{desired} - r_{measured})^2 + W_2 \sum_1^4 P_i + W_3(T_{desired} - T_{actual})^2] dt \qquad \text{Eq. [5]}$$

In Equation [5], J is an objective function (performance index), $W_1$, $W_2$ and $W_3$ are weighting factors, $r_{desired}$ is a driver's desired yaw rate, $r_{measured}$ is a measured yaw rate, $P_i$ is wheel control pressure, $T_{desired}$ is driver's desired engine torque, and $T_{actual}$ is controlled engine torque.

A first term of Equation [5] represents a difference between the driver's desired yaw rate for the vehicle and the actual vehicle yaw rate, and a second term represents control pressure for each wheel. The third term of Equation [5] represents a difference between the driver's desired engine torque and controlled actual engine torque. It is preferable to control the performance index such that the values of respective terms become small. However, it is, in fact, impossible, so a compromise must be established. That is, even though the first term is increased, the control is prohibited to a certain extent, thus maintaining the comfort of the driver by preventing the generation of excessive braking pressure. Further, if the increase of the first term is slight, further control pressure is not generated. That is, if the wheel slip is equal to or greater than a reference value, the control pressure is restricted. The reason for this is that excessive increase in the pressure may cause the wheels to be locked, and consequently decreases the vehicle stability and causes frequent pressure control. Here, a method of determining a reference slip value controls the reference slip value to have different values according to respective driving conditions because influence of the wheel slip on the vehicle moment is different according to a road surface and a vehicle speed.

FIG. 5 is a view showing a lookup table for determining the reference amount of the wheel slip. As shown in FIG. 5, the road surface friction coefficient $\mu$ is evenly divided by n according to vehicle speeds, and the amount of wheel slip $\lambda$ for generating compensation vehicle moment in all conditions is determined.

Meanwhile, if the engine torque is excessively decreased to reduce the first term of Equation [5], the driver's sense of acceleration must not be decreased. When the road surface friction coefficient is small, as when driving on ice, wheels are easily locked by braking pressure. Therefore, it is preferable to reduce the value of the first term using the third term rather than using the second term.

In the present invention, it is important to precisely estimate the driver's desired yaw rate. For this estimation, It is significant to obtain the exact steering wheel angle and the reference vehicle speed used to calculate the yaw rate.

Hereinafter, methods of performing zero angle detection of the steering wheel angle, and obtaining the reference vehicle speed is described in detail.

<Zero Angle Detection of Steering Wheel Angle>

A relative steering wheel angle sensor can be used after a zero angle detection is performed. A basis for determining whether an actual steering wheel angle is 0°, −360°, and 360° in the zero angle detection is required. For this basis, a vehicle dynamic relation between a steering wheel angle and a vehicle yaw rate in a normal condition is used, as indicated in Equation [6]. If a steering wheel angle estimated in the vehicle dynamic relation is within ±180° after the zero angle detection is performed, the actual steering wheel angle is determined to be 0°. Further, if the estimated steering wheel angle is equal to or greater then −180°, the actual steering wheel angle is determined to be −360°, while if the estimated steering wheel angle is equal to or greater than 180°, the actual steering wheel angle is determined to be 360°.

$$\delta = i\frac{r}{V}(L + K_{us}V^2/g) \quad \text{Eq. [6]}$$

In Equation [6], δ is a steering wheel angle,
is a steering gear ratio,
r is a measured yaw rate,
V is a vehicle speed,
L is a wheelbase,
$K_{us}$ is an understeering coefficient, and
g is gravity acceleration.

<Setting of Vehicle Speed>

If the vehicle employs front-wheel drive or rear-wheel drive, the reference vehicle speed is calculated from the wheels not being driven. Further, if the vehicle employs four-wheel drive, the vertical acceleration sensor is also used to calculate the reference vehicle speed.

The following Equation [7] represents a relation for determining the vehicle speed, $$V\text{ref}(n+1) = \alpha[a_{x0}(n+1) + a_x(n+1)]\Delta t + (1-\alpha)[c_1 V\text{ref}(n) + (1-c_1)V_{wheel}(n+1)] \quad \text{Eq. [7]}$$

where Vref is a reference vehicle speed,
α is a weighting factor of the vertical acceleration,
$a_{x0}$ is a perturbation factor of the vertical acceleration,
$a_x$ is a vehicle's vertical acceleration value,
Δt is an integration time,
$c_1$ is a weighting factor of a previous reference vehicle speed, and
$V_{wheel}$ is a wheel speed.

For four-wheel drive vehicles, spins occur in all wheels due to the driving force, so the reference vehicle speed cannot be determined using only the wheel speed. Therefore, the vertical acceleration value is determined by the vehicle vertical acceleration sensor, and is integrated to obtain the reference vehicle speed. In this case, the vertical acceleration sensor value may involve an error. For example, an error may occur due to the gravity acceleration when the vehicle travels on a banked road, such as an uphill or downhill road, so the perturbation factor such as $a_{x0}$ is included to obtain the reference vehicle speed. Meanwhile, if there is no wheel spin, such as in the case of two-wheel drive vehicles, the reference vehicle speed is obtained using the wheel speed. That is, the reference vehicle speed is determined by varying the weighting factor according to the reliability of the vertical acceleration sensor value and the wheel speed.

On the other hand, if the vehicle yaw rate is equal to or greater than a predetermined value, and the steering wheel angle is equal to or greater than a predetermined value, it is effective to correct the reference vehicle speed by using the yaw rate value detected by the mounted yaw rate sensor.

<Cooperative Control with ABS Control>

In the vehicle stability control system of the present invention, target slips of the inner rear wheel and the outer front wheel controlled in understeering and oversteering, respectively, are determined using values set in the vehicle stability control system without using values set in the ABS.

Further, the lateral force of rear wheels is increased by decreasing the target slip of the inner rear wheel in oversteering (spinning-out), thus allowing insufficient yaw moment caused by braking force at the outer rear wheel to be compensated for.

In understeering, the target slip of the outer front wheel is also decreased in the same manner as that of the oversteering.

In this case, a method of determining the target slip sets the amount of slip to correspond to respective driving conditions by analyzing influences of the wheel slip on the vehicle yaw moment according to a road surface, a road surface friction coefficient and a vehicle speed, as described above with reference to FIG. 5.

<Cooperative Control with TCS>

The vehicle stability control system of the present invention cooperatively performs control together with the TCS control so as to reduce braking pressure of all controlled wheels while preventing the rocking of the vehicle by reducing engine driving torque in the case where the movement of the vehicle is excessive and so requires great braking force or the road surface friction coefficient is small. If the vehicle is a front-wheel drive car, the lateral force of front wheels is increased by decreasing a target wheel spin (that is, reducing the target torque) in understeering (plowing). On the contrary, if the vehicle is a rear-wheel drive car, lateral force of rear wheels is increased by decreasing the target wheel spin in oversteering (spinning-out). If the vehicle is a four-wheel drive car, driving torque is decreased by reducing the target wheel spin in any case of understeering or oversteering.

Meanwhile, the cooperative control with a brake intervention traction system (BTCS) restricts wheel slip by using the reference wheel slip of FIG. 5, like the cooperative control with the ABS.

As described above, the present invention provides a method of controlling the traveling stability of a vehicle, which can obtain excellent vehicle stability by controlling the braking force applied to wheels together with the driving force of an engine after exactly estimating a driver's desired yaw rate according to road surface conditions to prevent understeering or oversteering which may be generated while turning.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. The method of controlling traveling stability of a vehicle, method comprising:
    setting a driver's desired yaw rates on various road surface conditions using a steering wheel angle and a reference speed of the vehicle while turning;
    judging a road surface condition on which the vehicle is traveling, by comparing lateral acceleration of the vehicle, which is estimated using the reference vehicle speed and a preset yaw rate on a preset reference road surface condition, with actual lateral acceleration measured by a lateral acceleration sensor;
    determining one of the driver's desired yaw rates corresponding to the judged road surface condition as a reference yaw rate, and determining whether the vehicle is understeered or oversteered by comparing the determined reference yaw rate with an actual yaw rate measured by a yaw rate sensor;
    controlling braking force and driving force according to the determination result;

wherein the reference vehicle speed is calculated to set the yaw rates, and if the vehicle is a four-wheel drive car, the reference vehicle speed is calculated using the following Equation by varying weighting factors according to reliability of a value detected by a vertical acceleration sensor and a wheel speed so as to calculate the reference vehicle speed in consideration of a perturbation factor due to an error of the vertical acceleration sensor and the gravity acceleration in traveling on a banked road:

$$V\text{ref}(n+1)=\alpha[a_{x0}(n+1)+a_x(n+1)]\Delta t+(1-\alpha)[c_1 V\text{ref}(n)+(1-c_1)V_{wheel}(n+1)]$$

where Vref is a reference vehicle speed, $\alpha$ is a weighting factor of the vertical acceleration, $a_{x0}$ is a perturbation factor of the vertical acceleration, $a_x$ is a vehicle's vertical acceleration value, $\Delta t$ is an integration time, $c_1$ is a weighting factor of a previous reference vehicle speed, and $V_{wheel}$ is a wheel speed.

2. The method of controlling traveling stability of a vehicle, method comprising:

setting a driver's desired yaw rates on various road surface conditions using a steering wheel angle and a reference speed of the vehicle while turning;

judging a road surface condition on which the vehicle is traveling, by comparing lateral acceleration of the vehicle, which is estimated using the reference vehicle speed and a preset yaw rate on a preset reference road surface condition, with actual lateral acceleration measured by a lateral acceleration sensor;

determining one of the driver's desired yaw rates corresponding to the judged road surface condition as a reference yaw rate, and determining whether the vehicle is understeered or oversteered by comparing the determined reference yaw rate with an actual yaw rate measured by a yaw rate sensor;

controlling braking force and driving force according to the determination result;

wherein at the braking force and driving force control step, braking pressure of a corresponding wheel and the amount of driving torque are controlled to satisfy the following Equation so as to prevent braking pressure from excessively increasing and locking the wheel, and facilitate the driver's will to travel by preventing an excessive decrease in engine torque:

$$J = \int [W_1(r_{desired} - r_{measured})^2 + W_2 \sum_1^4 P_i + W_3(T_{desired} - T_{actual})^2] dt$$

where J is an objective function (performance index), $W_1$, $W_2$ and $W_3$ are weighting factors, $r_{desired}$ is a driver's desired yaw rate, $r_{measured}$ is a measured yaw rate, $P_i$ is wheel control pressure, $T_{desired}$ is driver's desired engine torque and $T_{actual}$ is controlled engine torque.

3. The method of controlling traveling stability of a vehicle according to claim 2, wherein the braking force and driving force control step is performed such that, if a slip value of the wheel is equal to or greater than a reference value, control pressure is not generated in the wheel, and the reference value is preset to correspond to a road surface friction coefficient and a vehicle speed.

* * * * *